(12) United States Patent
Knott et al.

(10) Patent No.: US 11,453,122 B2
(45) Date of Patent: Sep. 27, 2022

(54) COLLABORATIVE ROBOT SYSTEM

(71) Applicant: BAE Systems plc, London (GB)

(72) Inventors: Martin Knott, Balderstone (GB);
Daniel James Middleton, Balderstone (GB)

(73) Assignee: BAE Systems plc, London (GB)

( * ) Notice: Subject to any disclaimer, the term of this patent is extended or adjusted under 35 U.S.C. 154(b) by 155 days.

(21) Appl. No.: 17/040,168

(22) PCT Filed: Mar. 27, 2019

(86) PCT No.: PCT/GB2019/050865
§ 371 (c)(1),
(2) Date: Sep. 22, 2020

(87) PCT Pub. No.: WO2019/186146
PCT Pub. Date: Oct. 3, 2019

(65) Prior Publication Data
US 2021/0114211 A1    Apr. 22, 2021

(30) Foreign Application Priority Data

Mar. 28, 2018 (EP) ..................................... 18164756
Mar. 28, 2018 (EP) ..................................... 18164760
(Continued)

(51) Int. Cl.
*B25J 9/16*       (2006.01)
*G06N 20/00*   (2019.01)
(Continued)

(52) U.S. Cl.
CPC ........... *B25J 9/1633* (2013.01); *B25J 9/1638* (2013.01); *B25J 13/08* (2013.01); *B25J 13/084* (2013.01);
(Continued)

(58) Field of Classification Search
USPC .............................. 700/245, 261; 73/862.08
See application file for complete search history.

(56) References Cited

U.S. PATENT DOCUMENTS 6,226,565 B1    5/2001  Elfving et al.
9,346,165 B1    5/2016  Metzger et al.
(Continued)

FOREIGN PATENT DOCUMENTS

EP          3284563 A2    2/2018

OTHER PUBLICATIONS

International Prelimiary Report on Patentability for PCT Patent Appl. No. PCT/GB2019/050865, dated Sep. 29, 2020, 14 Pages.
(Continued)

*Primary Examiner* — Dalena Tran
(74) *Attorney, Agent, or Firm* — Maine Cernota & Rardin (57) ABSTRACT

A system for robot and human collaboration. The system comprises: a multi-axis robot; one or more torque sensors, each torque sensor being configured to measure a torque about a respective axis of the multi-axis robot; and a controller configured to: receive one or more torque measurements taken by the one or more torque sensors; compare the one or more torque measurements or a function of the one or more torque measurements to a threshold value; and control the multi-axis robot based on the comparison.

20 Claims, 2 Drawing Sheets

(30) Foreign Application Priority Data

Mar. 28, 2018 (GB) .................................... 1805054
Mar. 28, 2018 (GB) .................................... 1805056

(51) Int. Cl.
  *B25J 13/08* (2006.01)
  *B25J 19/06* (2006.01)

(52) U.S. Cl.
  CPC .......... *B25J 13/085* (2013.01); *B25J 19/063* (2013.01); *G06N 20/00* (2019.01)

(56) References Cited

U.S. PATENT DOCUMENTS

| | | | |
|---|---|---|---|
| 9,778,745 B2* | 10/2017 | Braun | G06F 3/03548 |
| 10,179,406 B2* | 1/2019 | Dalibard | B25J 9/1697 |
| 10,898,999 B1* | 1/2021 | Cohen | B25J 9/0003 |
| 2011/0166696 A1 | 7/2011 | Nignon | |
| 2012/0109374 A1 | 5/2012 | Lee et al. | |
| 2015/0057798 A1 | 2/2015 | Meissner et al. | |
| 2015/0290809 A1 | 10/2015 | Nakagawa et al. | |
| 2016/0082593 A1 | 3/2016 | Inagaki et al. | |
| 2016/0089790 A1 | 3/2016 | Wang et al. | |
| 2016/0214261 A1 | 7/2016 | Davis et al. | |
| 2017/0028565 A1 | 2/2017 | Matsudaira | |
| 2017/0106541 A1 | 4/2017 | Naitou | |
| 2017/0151680 A1 | 6/2017 | Liang et al. | |
| 2017/0285625 A1 | 10/2017 | Sato et al. | |
| 2018/0065256 A1 | 3/2018 | Naitou | |
| 2018/0126555 A1* | 5/2018 | Nakazato | G05B 19/4183 |
| 2018/0200881 A1 | 7/2018 | Ishii | |

OTHER PUBLICATIONS

Partial Search Report of European application No. EP18164756.1, dated Aug. 31, 2018, 18 pages.
Extended Search Report of European application No. 18164756.1, dated Aug. 31, 2018, 15 pages.
Search Report under Section 17(5) of Great Britain application No. GB1805054.2, dated Sep. 25, 2018, 4 pages.
Search Report under Section 17 of Great Britain application No. GB1904217.5, dated Sep. 25, 2019, 4 pages.
International Search Report and Written Opinion of International Application No. PCT/GB2019/050865, dated Jun. 19, 2019, 18 pages.
Extended Search Report of European application No. 18164760.3, dated Sep. 4, 2018, 11 pages.

* cited by examiner

COLLABORATIVE ROBOT SYSTEM

RELATED APPLICATIONS

This application is a national phase application filed under 35 USC § 371 of PCT Application No. PCT/GB2019/050865 with an International filing date of Mar. 27, 2019, which claims priority of GB Patent Application 1805054.2 filed Mar. 28, 2018, GB Patent Application 1805056.7 filed Mar. 28, 2018, EP Patent Application 18164756.1 filed Mar. 28, 2018, and EP Patent Application 18164760.3 filed Mar. 28, 2018. Each of these applications is herein incorporated by reference, in its entirety, for all purposes.

FIELD OF THE INVENTION

The present invention relates to collaborative robot systems, and more particularly to systems for robot and human collaboration.

BACKGROUND

Conventionally, robots, e.g. robot arms, operate in workspaces that are remote from the workspaces of humans. The workspaces of robot and human are typically separated by, for example, safety barriers or fences.

In recent years, the use of collaborative robots that share workspaces with humans has increased. Collaborative robots are designed to work with or near humans to enable humans and robots to collaborate so as to complete tasks. Such tasks include, but are not limited to, vehicle (e.g. aircraft) manufacturing and assembly tasks. Humans may work within or near the working space of the robot. In other words, humans and collaborative robot may share a common workspace.

In collaborative robot systems, safety tends to be important in order to prevent injury to a human.

SUMMARY OF THE INVENTION

In a first aspect, the present invention provides a system for robot and human collaboration. The system comprises: a multi-axis robot; one or more torque sensors, each torque sensor being configured to measure a torque about a respective axis of the multi-axis robot; and a controller configured to: receive one or more torque measurements taken by the one or more torque sensors; compare the one or more torque measurements or a function of the one or more torque measurements to a threshold value; responsive to determining that the one or more torque measurements or a function of the one or more torque measurements is below the threshold value, control the multi-axis robot so as to cause the one or more torque measurements or the function of the one or more torque measurements to increase to a higher value, the higher value being below the threshold value, wherein controlling the multi-axis robot comprises at least one of increasing a speed of movement of the multi-axis robot and adjusting a path for the multi-axis robot; and, responsive to determining that the one or more torque measurements or a function of the one or more torque measurements is above the threshold value, decrease a speed of movement of the multi-axis robot.

The controller may be configured to control the multi-axis robot so as to cause the one or more torque measurements or a function of the one or more torque measurements to increase to a higher value by performing an optimisation process to optimise at least one of the speed of movement of the multi-axis robot and the path for the multi-axis robot with respect to the threshold value. The controller may be configured to, using the one or more torque measurements or a function of the one or more torque measurements, determine a mass of an object held by an end effector of the robot arm, and control the multi-axis robot so as to cause the one or more torque measurements or a function of the one or more torque measurements to increase to a higher value using the determined mass. The controller may be configured to implement machine learning. The controller may be configured to: determine that the multi-axis robot cannot achieve a predetermined task without the one or more torque measurements or the function of the one or more torque measurements exceeding the threshold value (e.g. using the aforementioned machine learning); responsive to the determination, iteratively increase the threshold value by a predetermined amount, and determine whether the multi-axis robot is able achieve the predetermined task without the one or more torque measurements or a function of the one or more torque measurements exceeding the increased threshold value, wherein the iteration is performed until the controller determines that the multi-axis robot can achieve the predetermined task without the one or more torque measurements or a function of the one or more torque measurements exceeding the current threshold value; and, thereafter, control the multi-axis robot based on the current threshold value. The controller may be configured to control the multi-axis robot to move at a first speed if the one or more torque measurements or a function of the one or more torque measurements is less than the threshold value, and control the multi-axis robot to move at a second speed if the one or more torque measurements or a function of the one or more torque measurements is greater than or equal to the threshold value. The second speed may be less than the first speed. The controller may be configured to, responsive to determining that the one or more torque measurements or a function of the one or more torque measurements is above the threshold value, bringing the multi-axis robot to a stop. A time period over which the multi-axis robot is brought to a stop may be dependent on the one or more torque measurements or a function of the one or more torque measurements.

The multi-axis robot may comprise an end effector for performing an action on an object. The system may further comprise one or more sensors configured to measure one or more physical properties of an object being acted on by or proximate to the end effector. The controller may be further configured to receive one or more sensor measurements taken by the one or more sensors, and set a value of the threshold based on the received one or more sensor measurements. The one or more sensors may comprise one or more sensors selected from the group of sensors consisting of: a tactile sensor, a vision system, a torque sensor, a vibration sensor, a strain gauge, a temperature sensor, and a pressure sensor. The controller may be configured to, using the received one or more sensor measurements, determine one or more parameters of the object selected from the group of parameters consisting of mass, shape, size, weight, texture, stiffness, centre of mass, coefficient of friction, thermal conductivity, and heat signature.

In a further aspect, the present invention provides a method for operating a multi-axis robot in a workspace shared by the multi-axis robot and a human. The method comprises: measuring, by one or more torque sensors, a torque about one or more axes of the multi-axis robot; receiving, by a controller, the one or more torque measurements taken by the one or more torque sensors; comparing, by the controller, the one or more torque measurements or a function of the one or more torque measurements to a threshold value; and either: if the controller determines that the one or more torque measurements or a function of the one or more torque measurements is below the threshold value, controlling, by the controller, the multi-axis robot so as to cause the one or more torque measurements or a function of the one or more torque measurements to increase to a higher value, the higher value being below the threshold value, wherein controlling the multi-axis robot comprises at least one of increasing a speed of movement of the multi-axis robot and adjusting a path for the multi-axis robot; or, if the controller determines that the one or more torque measurements or a function of the one or more torque measurements is above the threshold value, decreasing, by the controller, a speed of the multi-axis robot.

Controlling the multi-axis robot so as to cause the one or more torque measurements or a function of the one or more torque measurements to increase to a higher value may comprise performing an optimisation process to optimise at least one of the speed of movement of the multi-axis robot and the path for the multi-axis robot with respect to the threshold value.

The method may further comprise, using the one or more torque measurements or a function of the one or more torque measurements, determining a mass of an object held by an end effector of the robot arm, and controlling the multi-axis robot so as to cause the one or more torque measurements or a function of the one or more torque measurements to increase to a higher value using the determined mass.

In a further aspect, the present invention provides a system for robot and human collaboration. The system comprises: a multi-axis robot; one or more torque sensors, each torque sensor being configured to measure a torque about a respective axis of the multi-axis robot; and a controller configured to: determine that the multi-axis robot cannot achieve a predetermined task without the one or more torque measurements or the function of the one or more torque measurements exceeding the threshold value; responsive to the determination, iteratively: increase the threshold value by a predetermined amount; and determine whether the multi-axis robot is able achieve the predetermined task without the one or more torque measurements or a function of the one or more torque measurements exceeding the increased threshold value, wherein the iteration is performed until the controller determines that the multi-axis robot can achieve the predetermined task without the one or more torque measurements or a function of the one or more torque measurements exceeding the current threshold value; and, thereafter, control the multi-axis robot based on the current threshold value.

In a further aspect, the present invention provides a system for robot and human collaboration. The system comprises: a multi-axis robot; one or more torque sensors, each torque sensor being configured to measure a torque about a respective axis of the multi-axis robot; and a controller configured to: receive one or more torque measurements taken by the one or more torque sensors; compare the one or more torque measurements or a function of the one or more torque measurements to a threshold value; and control the multi-axis robot based on the comparison.

The controller may be configured to: control the multi-axis robot to move at a first speed if the one or more torque measurements or a function of the one or more torque measurements is less than the threshold value, and control the multi-axis robot to move at a second speed (different to the first speed) if the one or more torque measurements or a function of the one or more torque measurements is greater than or equal to the threshold value. The second speed may be less than the first speed.

The controller may be configured to, responsive to the one or more torque measurements or a function of the one or more torque measurements exceeding the threshold value, control the multi-axis robot to perform a predetermined action. The predetermined action may comprise the multi-axis robot stopping moving according to a predetermined stop method. The controller may be configured to, in the event that the predetermined action (e.g. a stop action) is performed, adjust the speed of motion of the multi-axis robot on subsequent controlling of the multi-axis robot thereby to lower experienced torque. Threshold values (such as the threshold value) may be dynamically adjusted based on the data gathered during previous motion attempts that resulted in the performance of the predetermined action (e.g. the stop action). A time period over which the multi-axis robot is brought to a stop may be dependent on the one or more torque measurements or a function of the one or more torque measurements. The predetermined action may comprise the multi-axis robot moving such that a torque experienced by the multi-axis robot is reduced.

The threshold value may be dependent on the one or more torque measurements or a function of the one or more torque measurements.

The multi-axis robot may comprise an end effector for performing an action on an object. The system may further comprise one or more sensors configured to measure one or more physical properties of an object being acted on by or proximate to the end effector. The controller may be further configured to: receive one or more sensor measurements taken by the one or more sensors; using the received one or more sensor measurements, determine whether or not the object being acted on by or proximate to the end effector is an expected object; and control the multi-axis robot based on the determination. The threshold value may be dependent on the one or more sensor measurements taken by the one or more sensors. The controller may be configured to control the end effector based on the determination. The end effector may comprise a gripper for gripping an object. The controller may be configured to, responsive to determining that the object being acted on by or proximate to the end effector is not an expected object, control the gripper to release the object. The one or more sensors may comprise one or more sensors selected from the group of sensors consisting of: a tactile sensor, a vision system, a torque sensor, a vibration sensor, a strain gauge, a temperature sensor, and a pressure sensor. The controller may be configured to determine whether or not the object being acted on by or proximate to the end effector is an expected object by using the received one or more sensor measurements to determine one or more parameters of the object selected from the group of parameters consisting of shape, size, weight, texture, stiffness, centre of mass, coefficient of friction, thermal conductivity, and heat signature.

The controller may be configured to adjust or control the kinematic motion of the multi-axis robot based on one or more parameters of the object selected from the group of parameters consisting of shape, size, weight, texture, stiffness, centre of mass, coefficient of friction, thermal conductivity, and heat signature. This may be performed such that the one or more torque measurements or a function of the one or more torque measurements does not exceed the threshold value. For example, the controller may be configured to adjust or control the kinematic motion of the multi-axis robot based on the weight of an object acted on by the multi-axis robot, which may be calculated based on the one or more torque measurements, or other sensors, and in such a way that the torque does not exceed the threshold value.

In a further aspect, the present invention provides a method for operating a multi-axis robot in a workspace shared by the multi-axis robot and a human. The method comprises: measuring, by one or more torque sensors, a torque about one or more axes of the multi-axis robot; receiving, by a controller, the one or more torque measurements taken by the one or more torque sensors; comparing, by the controller, the one or more torque measurements or a function of the one or more torque measurements to a threshold value; and controlling, by the controller, the multi-axis robot based on the comparison.

In a further aspect, the present invention provides a system for robot and human collaboration. The system comprises: a multi-axis robot comprising an end effector for performing an action on an object; one or more sensors configured to measure one or more physical properties of an object being acted on by or proximate to the end effector; and a controller configured to: receive one or more sensor measurements taken by the one or more sensors; using the received one or more sensor measurements, determine whether or not the object being acted on by or proximate to the end effector is an expected object; and control the multi-axis robot based on the determination.

The one or more sensors may comprise one or more sensors selected from the group of sensors consisting of: a tactile sensor, a vision system, a torque sensor, a vibration sensor, a strain gauge, a temperature sensor, and a pressure sensor. The one or more sensors may comprise one or more tactile sensors. The one or more sensors may comprise a vision system comprising one or more cameras selected from the group of cameras consisting of a visible camera, an infrared camera, an ultraviolet camera, and a full-spectrum camera.

The end effector may comprise a gripper for gripping an object. The controller may be configured to, responsive to determining that the object being acted on by or proximate to the end effector is not an expected object, control the gripper to release the object.

The controller may be configured to, responsive to determining that the object being acted on by or proximate to the end effector is not an expected object, control the multi-axis robot to stop moving according to a predetermined stop method. The controller may be configured to determine whether or not the object being acted on by or proximate the end effector is an expected object by using the received one or more sensor measurements to determine one or more parameters of the object selected from the group of parameters consisting of weight, texture, stiffness, centre of mass, coefficient of friction, thermal conductivity, and heat signature.

The system may further comprise one or more torque sensors, each torque sensor being configured to measure a torque about a respective axis of the multi-axis robot. The controller may be further configured to: receive one or more torque measurements taken by the one or more torque sensors; compare the one or more torque measurements or a function of the one or more torque measurements to a threshold value; and control the multi-axis robot based on the comparison.

The controller may be configured to control the multi-axis robot to move at a first speed if the one or more torque measurements or a function of the one or more torque measurements is less than the threshold value, and control the multi-axis robot to move at a second speed (which may be different to the first speed) if the one or more torque measurements or a function of the one or more torque measurements is greater than or equal to the threshold value. The second speed may be less than the first speed. The controller may be configured to, responsive to the one or more torque measurements or a function of the one or more torque measurements exceeding the threshold value, control the multi-axis robot to perform a predetermined action. The predetermined action may comprise the multi-axis robot stopping moving according to a predetermined stop method. The controller may be configured to, in the event that the predetermined action (e.g. a stop action) is performed, adjust the speed of motion of the multi-axis robot on subsequent controlling of the multi-axis robot thereby to lower experienced torque. Threshold values (such as the threshold value) may be dynamically adjusted based on the data gathered during previous motion attempts that resulted in the performance of the predetermined action (e.g. the stop action). A time period over which the multi-axis robot is brought to a stop may be dependent on the one or more torque measurements or a function of the one or more torque measurements. The predetermined action may comprise the multi-axis robot moving such that a torque experienced by the multi-axis robot is reduced.

In a further aspect, the present invention provides a method for operating a multi-axis robot in a workspace shared by the multi-axis robot and a human. The multi-axis robot comprises an end effector for performing an action on an object. The method comprises: measuring, by one or more sensors, one or more physical properties of an object being acted on by or proximate to the end effector; receiving, by a controller, one or more sensor measurements taken by the one or more sensors; determining, by the controller, using the received one or more sensor measurements, whether or not the object being acted on by or to proximate to the end effector is an expected object; and controlling, by the controller, the multi-axis robot based on the determination.

DETAILED DESCRIPTION

Figure 1:
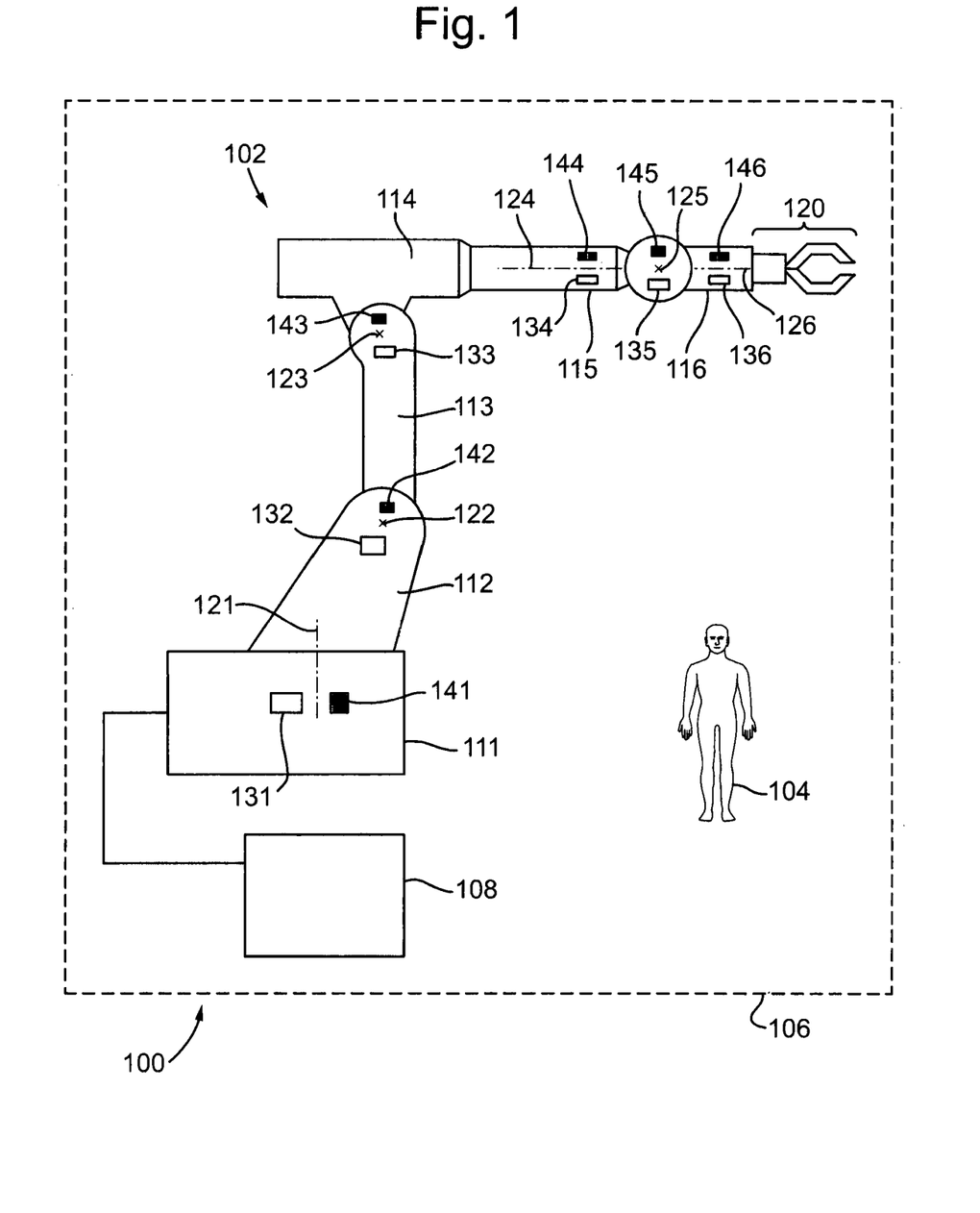
FIG. 1 is a schematic illustration (not to scale) showing a human-collaborative robot system.

FIG. 1 is a schematic illustration (not to scale) showing an embodiment of a system 100 for robot-human collaboration. The system 100 comprises a robot 102 (which may also be referred to as a robot arm) and a human 104 which share a common workspace 106. Both the robot 102 and the human 104 may move within the common workspace 106.

The system 100 further comprises a controller 108 operatively coupled to the robot 102 and configured to control operation of the robot 102. The controller 108 is described in more detail later below with reference to FIG. 2.

The robot 102 is a six-axis articulated robot. More specifically, the robot 102 comprises six arm portions, namely a first portion 111, a second portion 112, a third portion 113, a fourth portion 114, a fifth portion 115, and a sixth portion 116.

The first portion 111 provides a base of the robot. The first portion 111 (i.e. the base) may be mounted to a floor, or may be mounted to a fixed structure, a piece of moving equipment, or any other suitable mounting surface or structure.

The robot 102 further comprises an end effector 120 located at the distal end of the robot. The end effector 120 is described in more detail later below with reference to FIG. 3.

The robot 102 includes a first rotary axis 121, a second rotary axis 122, a third rotary axis 123, a fourth rotary axis 124, a fifth rotary axis 125, and a sixth rotary axis 126. The robot 100 further comprises a first motor 131, a second motor 132, a third motor 133, a fourth motor 134, a fifth motor 135, and a sixth motor 131, which separately operate a respective axis 121-126, i.e. the first motor 131 controls rotation about the first axis 121, the second motor controls rotation about the second axis 122, and so on.

The operation of the individual axes 121-126 allows the robot's end effector 120 to be repeatably and accurately positioned, for example, with respect to a workpiece. Roll, pitch and yaw of the end effector 120 also tend to be controllable.

In this embodiment, the robot 102 further comprises a plurality of torque sensors 141-146, each torque sensor 141-146 being configured to detect a torque acting on each joint of the robot 102. More specifically, a first torque sensor 141 is located at or proximate to a joint between the first and second arm portions 111, 112, and is configured to measure a torque about the first axis 121. A second torque sensor 142 is located at or proximate to a joint between the second and third arm portions 112, 113, and is configured to measure a torque about the second axis 122. A third torque sensor 143 is located at or proximate to a joint between the third and fourth second arm portions 113, 114, and is configured to measure a torque about the third axis 123. A fourth torque sensor 144 is located at or proximate to a joint between the fourth and fifth arm portions 114, 115, and is configured to measure a torque about the fourth axis 124. A fifth torque sensor 145 is located at or proximate to a joint between the fifth and sixth arm portions 115, 116, and is configured to measure a torque about the fifth axis 125. A sixth torque sensor 146 is located at or proximate to a joint between the sixth arm portion 116 and the end effector 120, and is configured to measure a torque about the sixth axis 126.

Figure 2:
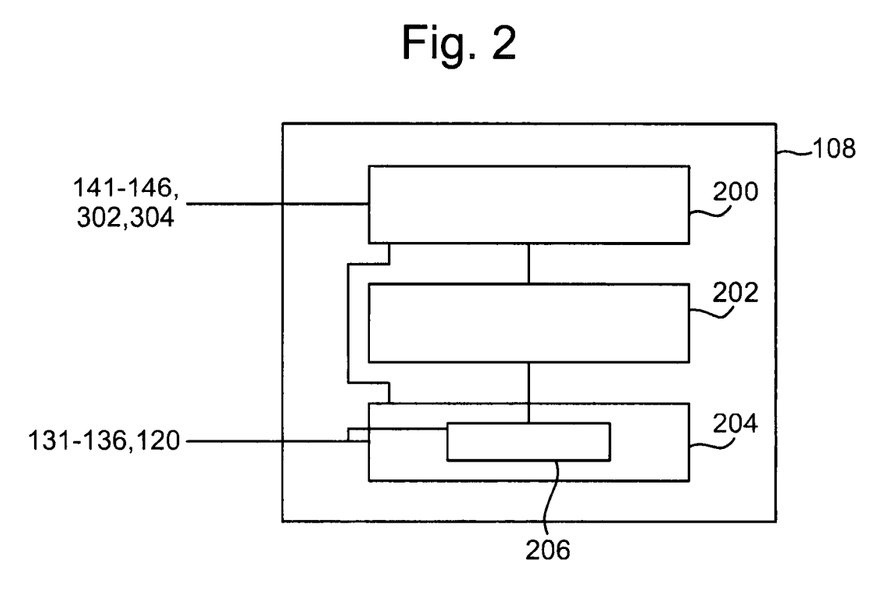
FIG. 2 is a schematic illustration (not to scale) showing controller of a collaborative robot.

FIG. 2 is a schematic illustration (not to scale) showing further details of the controller 108.

The controller 108 may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

In this embodiment, the controller 108 comprises a sensor interface 200, a collision detection module 202, and a motor control module 204. The motor control module 204 comprises a motor brake module 206.

In this embodiment, the sensor interface 200 is operatively coupled, e.g. via wired or wireless links, to the torque sensors 141-146, and is configured to receive torque measurements from each of the torque sensors 141-146. The torque measurements are physical parameter values as associated with operating states of the robot 102. The torques experienced by the robot 102 and measured by the torque sensor 141-146 tend to vary depending on a contact force which results from the robot 102 contacting an external object, for example if the robot 102 collides with the human 104 or engages a workpiece. Magnitudes of these torques tend to be dependent on the magnitude of the contact force experienced by the robot 102. The sensor interface 200 is further coupled to the collision detection module 202 such that the sensor interface 200 may send the received torque measurements to the collision detection module 202. The sensor interface 200 is further coupled to the motor control module 204 such that the sensor interface 200 may send the received torque measurements to the motor control module 204.

In this embodiment, in addition to being operatively coupled to the sensor interface 200, the collision detection module 202 is operatively coupled, e.g. via wired or wireless links, to the motor brake module 206.

The collision detection module 202 is configured to determine, using the torque measurements received from the sensor interface 200, whether or not the robot 102 has unexpectedly collided or impacted with an object, for example the human 104. In this embodiment, in operation the collision detection module 202 compares one or more of the received torque measurements or some function of one or more of the received torque measurements to a predetermined threshold value corresponding to a maximum allowable torque, which is hereinafter referred to as the maximum torque threshold $T_{max}$. If the one or more received torque measurements or some function of the one or more received torque measurements is greater than or equal to the maximum torque threshold $T_{max}$, the collision detection module 202 determines that an unwanted collision between the robot 102 and an external object has occurred. In this case, the collision detection module 202 sends a collision message to the motor brake module 206, informing the motor brake module 206 of the detected collision. However, if the one or more received torque measurements or some function of the one or more received torque measurements is less than the maximum torque threshold $T_{max}$, the collision detection module 202 determines that no collision (or an insignificant or non-dangerous collision) between the robot 102 and an external object has occurred, and as such no collision message is sent.

In this embodiment, in addition to being coupled to the collision detection module 202, the motor control module 204 is operatively coupled, e.g. via wired or wireless links, to the motors 131-136. The motor control module 204 is configured to control operation of the motors 131-136 to move the robot 102. For example, in operation, the motor control module 204 may generate command signals for the robot 102, and send those command signals to the robot 102 so as to control the robot 102 to perform a predetermined task according to a robot program. Also, the motor control module 204 is configured to control the end effector 120.

In this embodiment, the motor control module 204 controls the motors 131-136 dependent on the torque measurements received from the sensor interface 200 or some function thereof. The motor control module 204 controls kinematic motion of the robot 102 based the received torque measurements or some function thereof.

In this embodiment, the controller 108 is configured such that, responsive to the collision detection module 202 determining that the one or more torque measurements or the function of the one or more torque measurements is below the maximum torque threshold $T_{max}$, the multi-axis robot is controlled, e.g. by the motor control module 204, so that the torque measurements taken by the torque sensors or the function of the torque measurements increases, but still remains below the maximum torque threshold $T_{max}$. In other words, the robot 102 is controlled so that the torque experienced by the robot increases. In this embodiment, controlling the robot 102 to increase the torque measurements taken by the torque sensors or the function of the torque measurements comprises increasing a speed of movement of the robot 102 and/or adjusting a path for the robot 102. For example, the path through which the robot 102 to be moved may be adjusted so that the robot 102 moves through tighter angles and/or the robot 102 has greater extension.

By controlling the robot 102 in this way, a given task for the robot 102 may be performed more quickly and/or more efficiently.

Preferably, responsive to determining that the one or more torque measurements or the function of the one or more torque measurements is below the maximum torque threshold $T_{max}$, the controller 108 controls the robot 102 so that it operates in a state where the one or more torque measurements or the function thereof are as close to the maximum torque threshold $T_{max}$ as possible, without exceeding that maximum torque threshold $T_{max}$. This may be achieved by performing an optimisation process to optimise operation of the robot 102 with respect to the maximum torque threshold $T_{max}$. For example, the controller 108 may determine an optimum speed of movement for the robot 102 with respect to the maximum torque threshold $T_{max}$ that, if implemented, would cause the one or more torque measurements or the function of the one or more torque measurements to be close (e.g. as close as possible) to the maximum torque threshold $T_{max}$ without exceeding it. Any appropriate optimisation process may be implemented.

In some embodiments, the operation of the robot 102 is optimised with respect to some function of the maximum torque threshold $T_{max}$. An example of such a function is $T_{opt}=T_{max}-\varepsilon$. In some embodiments, $\varepsilon$ is a constant value. In some embodiments, $\varepsilon$ is a function of a mass of an object being carried by the robot 102, e.g. being gripped by the end effector 120 of the robot 102. In other words, $\varepsilon=\varepsilon(m)$, where m is the mass of an object or objects being held by the end effector 120. The mass of the object m may be determined in any appropriate way. For example, the mass of the object m may be determined or inferred by the controller 108 using the torque measurements taken by the torque sensors. The mass of the object m may be determined or inferred by the controller 108 using measurements of the object taken by one or more sensors located on the end effector 120, such as those described in more detail later below with reference to FIG. 3.

In some embodiments, the controller 108 is configured to determine whether or not a predetermined task (e.g. a task specified in a robot program that is accessible by the controller 108) is achievable by the robot 102 without the one or more torque measurements taken by the torque sensors or a function thereof exceeding the maximum torque threshold $T_{max}$. In other words, the controller 108 may be configured to determine whether it is possible to control the robot 102 to perform a given task or operation without exceeding the maximum torque threshold $T_{max}$. For example, the controller 108 may, using a specification of the predetermined task (e.g. a program for the robot 102 that specifies the task), predict the one or more torque measurements that would be taken by the torque sensors were the robot 102 to be controlled to perform that specified task, and determine whether or not the one or more predicted torque measurements or the function of the one or more predicted torque measurements is below the maximum torque threshold $T_{max}$.

In some embodiments, the controller 108 is configured to implement a machine learning process. The machine learning process may be implemented, for example, to determine whether or not a predetermined task is achievable by the robot 102 without the one or more torque measurements taken by the torque sensors or a function thereof exceeding the maximum torque threshold $T_{max}$. In some embodiments, training data (or sample data) for a machine learning algorithm is generated by controlling the robot 102 to perform the same predetermined task multiple times using different payload masses (i.e. different loads held by the end effector) or varying one or more other parameters (such as an overall programmed velocity, a force threshold, a torque threshold etc.). The training data may include values for any appropriate parameters, for example parameters including one or more parameters selected from the group of parameters consisting of joint angles, joint limits, torque per joint, force per joint, actual velocities, move type, tool acceleration, tool force, tool torque, tool position, elapsed time, etc. A machine learning algorithm may be used to build a mathematical model of this training data. Any appropriate machine learning algorithm may be implemented, including but not limited to an artificial neural network, a support vector machine, a Bayesian network, and/or a genetic algorithm. The machine algorithm may be implemented to learn associations between classification features (i.e. the parameters such as joint angles, joint limits, torque per joint, force per joint, actual velocities, move type, tool acceleration, tool force, tool torque, tool position, elapsed time, etc.). Once trained, the machine learning algorithm may be presented with a new (e.g. unfamiliar) payload mass (or other parameter), and predict or determine values of the classification features. These predictions or determined classification features may then be used to determine whether the predetermined task can be accomplished with the new payload mass while satisfying one or more criteria, such as without the one or more torque measurements taken by the torque sensors or a function thereof exceeding the maximum torque threshold $T_{max}$.

In some embodiments, the predetermined task that is repeatedly performed to generate the training data comprises multiple sections or sub-tasks. These sections or sub-tasks can be used to build new tasks that may be used to generate new training data.

In some embodiments, the controller 108 is configured to, responsive to determining that the predetermined task cannot be performed by the robot 102 without the one or more torque measurements taken by the torque sensors or a function thereof exceeding the maximum torque threshold $T_{max}$, iteratively perform the following steps:

(i) increase the maximum torque threshold $T_{max}$ by a predetermined amount; and (ii) determine whether the robot (102) is able achieve the predetermined task without the one or more torque measurements or a function of the one or more torque measurements exceeding the increased maximum torque threshold $T_{max}$.

In some embodiments, there is an upper limit $T_{max\_UL}$ to the maximum torque threshold $T_{max}$ beyond which the maximum torque threshold $T_{max}$ cannot be increased.

The iterative process may be performed until, for example, the controller 108 determines that the robot 102 can achieve the predetermined task without the one or more torque measurements or a function of the one or more torque measurements exceeding the current maximum torque threshold $T_{max}$. In some embodiments, the iterative process is performed for a predefined time period, or a predefined number of iterations. In some embodiments, the iterative process is performed until $T_{max}$ reaches $T_{max\_UL}$. The controller 108 may then control the robot 102 based on the current (i.e. increased) maximum torque threshold $T_{max}$.

Advantageously, increasing the maximum torque threshold $T_{max}$ increases the operating envelope of the robot 102, allowing the robot 102 to move and impact with increased force in order to achieve the desired task. Typically, it tends not to be desirable to operate with relatively high $T_{max}$ values, particularly when working with sensitive, fragile and/or high cost components for example, since such high $T_{max}$ values may allow for collisions between mating components or moving sensor arrays into restricted access areas. The process of iteratively increasing the $T_{max}$ value tends to allow for lower values of $T_{max}$ to be implemented if these allow for performance of the predetermined task, thereby reducing the likelihood of damage, and to only consider relatively higher values of $T_{max}$ if the relatively lower values do not allow the predetermined task to be performed or completed.

In this embodiment, the controller 108 is configured such that, responsive to the collision detection module 202 determining that the one or more torque measurements or a function of the one or more torque measurements is above the maximum torque threshold $T_{max}$, the multi-axis robot is controlled, e.g. by the motor control module 204, so as to decrease a speed of movement of the multi-axis robot 102, for example to bring the robot 102 to a stop as described in more detail later below.

The torque experienced by the robot 102, and therefore the measured torque values, tend to be indicative of a load experienced by the robot 102, for example a load being carried or moved by the end effector 120 of the robot 102.

In some embodiments, when one or more of the received torque measurements or some function of one or more of the received torque measurements is less than a first threshold value $T_1$ (which condition may correspond to the robot 102 carrying or moving a relatively light load), the motor control module 204 controls the motors 131-136 such that the robot 102 is moved at up to and including a first speed. The first speed is a relatively high speed, for example, between 60% and 100% of the robot's maximum speed (e.g. 60%, 70%, 80%, 90%, or 100% of the robot's maximum speed). In this embodiment, when one or more of the received torque measurements or some function of one or more of the received torque measurements is greater than or equal to the first threshold value $T_1$ and also less than a second threshold $T_2$ (which condition may correspond to the robot 102 carrying or moving a relatively heavy load and/or above which kinematic motion could have undesired characteristics), the motor control module 204 controls the motors 131-136 such that the robot 102 is moved at up to and including a second speed, which is less than the first speed. The second threshold $T_2$ may be equal to or lower than the maximum torque threshold $T_{max}$. The second speed is a relatively low speed, for example, between 10% and 50% of the robot's maximum speed (e.g. 10%, 20%, 30%, 40%, or 50% of the robot's maximum speed). The second speed may be a function of payload weight or another parameter associated with the payload. Thus, the kinematic motion of the robot 102 is tuneable depending on the load being carried by the robot 102. This advantageously tends to improve human safety within the workspace 106.

In some embodiments, the motion speed of the robot 102 may be a function of the measured torque, for example the second speed may reduce as the measured torque increases. The motion speed of the robot 102 may be dynamically adjusted based on measured torque values.

In this embodiment, the motor brake module 206 is operatively coupled, e.g. via wired or wireless links, to the collision detection module 202 and the motors 131-136. The motor brake module 206 is configured to, in response to receiving the collision message from the collision detection module 202 indicating a collision between the robot 102 and another entity, generate a "stop" or "lock" signal for stopping operation of the motors 131-136. The motor brake module 206 is configured to send the generated stop signal to the motors 131-136 to stop operation of the motors and thereby lock the robot 102 in its current position such that further movement of the robot 100 is opposed or prevented. It will be appreciated that, if the motor brake module 206 does not receive a collision message from the collision detection module 202, it does not generate a stop signal, and, in this case, and the motor control module 204 continues to control the robot 102 to perform the predetermined task.

The motor brake module 206 may, using the stop signal, control the robot 102 to perform a quick or substantially immediate stop to stop/lock the robot 102 as quickly as possible. Alternatively, the motor brake module 206 may, using the stop signal, control the robot 102 to perform a gradual stop to stop/lock the robot 102 over a longer period of time. The time period over which the robot 102 is brought to a stop may, for example, depend on the one or more torque measurements or a function thereof. Thus, the stop operation of the robot 102 may be selectively performed dependent on the magnitude of the measured torques. In some embodiments, the stopping or slowing of the robot 102 is performed based on one or more safety system conditions.

In some embodiments, the motor brake module 206 may, in response to receiving the collision message from the collision detection module 202, control the robot 102 such that the torque experienced by the robot 102 decreases (i.e. such that the one or more torque measurements decrease). This tends to cause the robot 102 to be moved so as to reduce the contact force acting on the robot 102, which tends to correspond to the robot 102 moving away from the object with which it has collided.

Advantageously, the above-described system, in particular the above described stop operation of the robot 102, tends to improve safety in the workspace 106 in which both the collaborative robot 102 and the human 104 are working. Risk of injury to the human and damage to the robot 102 tends to be reduced.

Figure 3:
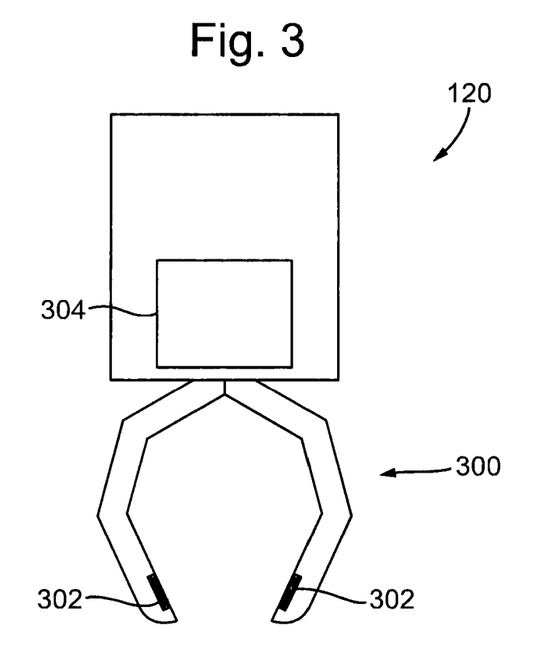
FIG. 3 is a schematic illustration (not to scale) showing an end effector of the collaborative robot.

FIG. 3 is a schematic illustration (not to scale) of the end effector 120.

In this embodiment the end effector 120 comprises a gripper 300, a plurality of tactile sensors 302, and a vision system 304.

The gripper 300 comprises a plurality of gripper arms. The gripper 300 is configured to be controlled by the controller 108 to allow the robot 102 to grip, move, and release a workpiece. The gripper 300 may allow the robot 102 to perform tasks including, but not limited to, holding parts, loading parts, unloading parts, assembling parts together, inspecting parts, and adjusting parts.

Each tactile sensor 302 is located at or proximate to an end of a respective gripper arm of the gripper 300. Each tactile sensor 302 is configured to measure information arising from physical interaction of that tactile sensor 302 with its environment. For example, the tactile sensors 302 may be configured to measure parameters of an object, including one or more parameters selected from the group of parameters consisting of shape, size, mass m, weight, texture, stiffness, centre of mass, coefficient of friction, and thermal conductivity. Preferably, the tactile sensors 302 are configured to detect contact of the gripper arms with an object that is being gripped between the gripper 300, for example by measuring a force or pressure exerted on the tactile sensors 302 by a gripped object.

The tactile sensors 302 are operatively coupled to the controller 108, e.g. via wired or wireless links, such that the tactile sensors 302 may send sensor measurements to the motor control module 204 via the sensor interface 200.

The vision system 304 is located proximate to the gripper 300 and is arranged to capture images of objects being gripped by the gripper 300 or proximate to the gripper 300 (e.g. about to be gripped by the gripper 300). The vision system 304 may be any appropriate type of vision system including, but not limited to, a visible light camera system, an infrared camera system, an ultraviolet camera system, or a full-spectrum camera system.

The vision system 304 is operatively coupled to the controller 108, e.g. via a wired or wireless link, such that the vision system 304 may send sensor measurements to the motor control module 204 via the sensor interface 200.

In this embodiment, the motor control module 204 is configured to control operation of the end effector 120 dependent on the sensor measurements received from the tactile sensors 302 and/or image data received from the vision system 304. For example, in operation, the motor control module 204 may use the sensor measurements received from the tactile sensors 302 and/or the image data received from the vision system 304 to infer the object that is being gripped by the gripper 300, or is proximate to the gripper 300 (e.g. about to be gripped by the gripper 300). If the motor control module 204 determines that the object being gripped by or proximate to the gripper 300 is not an "expected object" (i.e. is not an object that the gripper 300 should be gripping), the motor control module 204 may control the end effector 120 to release the gripped object or to lock its position. The motor control module 204 may determine that the object is not an "expected object" if, for example, the sensor measurements received from the tactile sensors 302 and/or image data received from the vision system 304 indicate that the object is of an unexpected size, shape, texture, colour, hardness, etc. and/or if the object has an unexpected heat signature. Thus, if for example a body part (e.g. a finger) of the human 104 was to be accidently gripped by the gripper 300, the controller 108 may control the gripper 300 to release the body part.

On the other hand, if the motor control module 204 determines that the object being gripped by or proximate to the gripper 300 is an "expected object" (i.e. an object that the gripper 300 should be gripping), the motor control module 204 may control the end effector 120 so as to exert a predetermined or pre-set force on that object. That predetermined force may be dependent on the type object detected. For example, a relatively small gripping force may be applied to relatively soft, lightweight and/or fragile objects, whereas a relatively large gripping force may be applied to relatively hard, heavy, and/or robust objects. Advantageously, because the object being gripped has been identified as an "expected object" it tends to be safe to apply a gripping force which is beyond limits imposed by collaborative-robotics standards, for example in areas deemed to be clear of trap or crush hazards to humans e.g. within 1 mm of expected object.

The motor control module 204 may be configured to control the motors 131-136 dependent on the sensor measurements received from the tactile sensors 302 and/or image data received from the vision system 304. For example, if the motor control module 204 determines that the object being gripped by or proximate to the gripper 300 is not an "expected object", the motor brake module 206 may generate a stop signal, and send the generated stop signal to the motors 131-136 to stop operation of the motors and thereby lock the robot 102 in its current position such that further movement of the robot 100 is opposed or prevented.

Advantageously, the above-described system, in particular the above described control of the end effector 120 and robot 102 based on tactile sensor measurements and/or vision system measurements, tends to improve safety in the workspace 106 in which both the collaborative robot 102 and the human 104 are working. Risk of injury to the human and damage to the robot 102 tend to be reduced.

Advantageously, the tactile sensors 302 tend to be highly sensitive and capable of measuring small changes in parameters.

The tactile sensors 302 and vision system 304 are complementary systems that tend to allow for a wide range of objects to be distinguished.

The above described system tends to be tuneable to the load being handled by the robot.

In some embodiments, the motor control module is configured to control the kinematic motion of the robot based on the tactile sensor measurements and/or vision system measurements, instead of or in addition to the torque measurements.

The maximum torque threshold $T_{max}$ may be determined based on, for example, tactile sensor measurements and/or vision system measurements. Thus, for example, if the object being gripped by the end effector is identified as a relatively heavy object, the maximum torque threshold $T_{max}$ may be increased so as to prevent unwanted/unnecessary stopping of the robot, whereas if the object being gripped by the end effector is identified as a relatively light object, the maximum torque threshold $T_{max}$ may be decreased so as to improve safety.

In the above embodiments, the robot is a six-axis robot. However, in other embodiments the robot has a different number of rotary axes about which it may be controlled to move. The robot may also include a different number of motors, i.e. other than six motors, for moving the robot. Also, in some embodiments, the robot may include one or more linear axes along which the robot may be moved. For example, the robot may be mounted to a rail or track along which it may be slid.

In the above embodiments, the robot comprises six torque sensors. However, in other embodiments, the robot comprises a different number of torque sensors, for example more than six torque sensors.

In the above embodiments, the robot comprises two tactile sensors. However, in other embodiments, the robot comprises a different number of tactile sensors, for example more than two tactile sensors.

In the above embodiments, the robot comprises a single vision system. However, in other embodiments, the robot comprises a different number of vision systems, for example more than one vision system.

In the above embodiments, the controller is configured to determine properties of the object being acted on by the end effector based on measurements taken by the tactile sensors and/or the vision system. However, in other embodiments, the properties of the object are determined based on measurements taken by one or more different types of sensors instead of or in additional to the tactile sensors and/or the vision system. For example, the end effector may include vibration sensors, strain gauges, temperature sensors, and/or pressure sensors for determining properties of the object.

In the above embodiments, the end effector comprises a gripper. However, in other embodiments, the robot may comprise a different type of end effector which may include a tool or device other than a gripper.

The invention claimed is:

1. A system for robot and human collaboration, the system comprising:
a multi-axis robot;
one or more torque sensors, each torque sensor being configured to measure a torque about a respective axis of the multi-axis robot; and
a controller configured to:
determine that the multi-axis robot cannot achieve a predetermined task without the one or more torque measurements or the function of the one or more torque measurements exceeding a threshold value;
responsive to the determination, iteratively:
increase the threshold value by a predetermined amount; and
determine whether the multi-axis robot is able achieve the predetermined task without the one or more torque measurements or a function of the one or more torque measurements exceeding the increased threshold value, wherein
the iteration is performed until the controller determines that the multi-axis robot can achieve the predetermined task without the one or more torque measurements or a function of the one or more torque measurements exceeding the current threshold value; and
thereafter, control the multi-axis robot based on the current threshold value
receive one or more torque measurements taken by the one or more torque sensors;
compare the one or more torque measurements or a function of the one or more torque measurements to the current threshold value;
responsive to determining that the one or more torque measurements or a function of the one or more torque measurements is below the current threshold value, control the multi-axis robot so as to cause the one or more torque measurements or the function of the one or more torque measurements to increase to a higher value, the higher value being below the current threshold value, wherein controlling the multi-axis robot comprises at least one of increasing a speed of movement of the multi-axis robot and adjusting a path for the multi-axis robot; and
responsive to determining that the one or more torque measurements or a function of the one or more torque measurements is above the current threshold value, decrease a speed of movement of the multi-axis robot.

2. The system according to claim 1, wherein the controller is configured to control the multi-axis robot so as to cause the one or more torque measurements or a function of the one or more torque measurements to increase to a higher value by performing an optimisation process to optimise at least one of the speed of movement of the multi-axis robot and the path for the multi-axis robot with respect to the threshold value.

3. The system according to claim 1, wherein the controller is configured to:
using the one or more torque measurements or a function of the one or more torque measurements, determine a mass of an object held by an end effector of the robot arm; and
control the multi-axis robot so as to cause the one or more torque measurements or a function of the one or more torque measurements to increase to a higher value using the determined mass.

4. The system according to claim 1, wherein the controller is configured to implement machine learning.

5. The system according to claim 1, wherein the controller is configured to:
control the multi-axis robot to move at a first speed if the one or more torque measurements or a function of the one or more torque measurements is less than the threshold value; and
control the multi-axis robot to move at a second speed if the one or more torque measurements or a function of the one or more torque measurements is greater than or equal to the threshold value.

6. The system according to claim 5, wherein the second speed is less than the first speed.

7. The system according to claim 1, wherein the controller is configured to, responsive to determining that the one or more torque measurements or a function of the one or more torque measurements is above the threshold value, bringing the multi-axis robot to a stop.

8. The system according to claim 7, wherein a time period over which the multi-axis robot is brought to a stop is dependent on the one or more torque measurements or a function of the one or more torque measurements.

9. The system according to claim 1, wherein:
the multi-axis robot comprises an end effector for performing an action on an object;
the system further comprises one or more sensors configured to measure one or more physical properties of an object being acted on by or proximate to the end effector; and
the controller is further configured to:
receive one or more sensor measurements taken by the one or more sensors; and
set a value of the threshold based on the received one or more sensor measurements.

10. The system according to claim 9, wherein the one or more sensors comprise one or more sensors selected from the group of sensors consisting of: a tactile sensor, a vision system, a torque sensor, a vibration sensor, a strain gauge, a temperature sensor, and a pressure sensor.

11. The system according to 9, wherein the controller is configured to, using the received one or more sensor measurements, determine one or more parameters of the object selected from the group of parameters consisting of mass, shape, size, weight, texture, stiffness, centre of mass, coefficient of friction, thermal conductivity, and heat signature.

12. The system according to claim 9, wherein the controller is configured to, responsive to determining that the object being acted on by or proximate to the end effector is not an expected object, control the multi-axis robot based on the determination.

13. The system according to claim 12, wherein controlling the multi-axis robot based on the determination of the object being acted on by or proximate the end effector comprises controlling the end effector to release the object.

14. The system according to claim 12, wherein controlling the multi-axis robot based on the determination of the object being acted on by or proximate the end effector comprises controlling the multi-axis robot to stop moving according to a predetermined stop method.

15. A method for operating a multi-axis robot in a workspace shared by the multi-axis robot and a human, the method comprising:
   determining, by a controller, that the multi-axis robot cannot achieve a predetermined task without the one or more torque measurements or the function of one or more torque measurements exceeding a threshold value; and
   responsive to the determination, iteratively:
   increasing the threshold value by a predetermined amount; and
   determining whether the multi-axis robot is able achieve the predetermined task without the one or more torque measurements or a function of the one or more torque measurements exceeding the increased threshold value,
   wherein the iteration is performed until the controller determines that the multi-axis robot can achieve the predetermined task without the one or more torque measurements or a function of the one or more torque measurements exceeding the current threshold value; and
   thereafter, controlling the multi-axis robot based on the current threshold value
   measuring, by one or more torque sensors, a torque about one or more axes of the multi-axis robot;
   receiving, by the controller, the one or more torque measurements taken by the one or more torque sensors;
   comparing, by the controller, the one or more torque measurements or a function of the one or more torque measurements to the current threshold value; and either:
   if the controller determines that the one or more torque measurements or a function of the one or more torque measurements is below the current threshold value, controlling, by the controller, the multi-axis robot so as to cause the one or more torque measurements or a function of the one or more torque measurements to increase to a higher value, the higher value being below the current threshold value, wherein controlling the multi-axis robot comprises at least one of increasing a speed of movement of the multi-axis robot and adjusting a path for the multi-axis robot; or
   if the controller determines that the one or more torque measurements or a function of the one or more torque measurements is above the current threshold value, decreasing, by the controller, a speed of the multi-axis robot.

16. The method of claim 15, wherein controlling the multi-axis robot so as to cause the one or more torque measurements or a function of the one or more torque measurements to increase to a higher value comprises performing an optimisation process to optimise at least one of the speed of movement of the multi-axis robot and the path for the multi-axis robot with respect to the threshold value.

17. The method of claim 15, further comprising:
   using the one or more torque measurements or a function of the one or more torque measurements, determining a mass of an object held by an end effector of the robot arm; and
   controlling the multi-axis robot so as to cause the one or more torque measurements or a function of the one or more torque measurements to increase to a higher value using the determined mass.

18. The method according to claim 15, wherein the multi-axis robot further comprises:
   an end effector for performing an action on an object, wherein the method further comprises:
   measuring, by one or more sensors one or more physical properties of an object being acted on by or proximate to the end effector; and
   receiving, by the controller, the one or more physical properties of an object being acted on by or proximate to the end effector;
   comparing, by the controller, the one or more physical properties of an object being acted on by or proximate to the end effector to known physical properties of the object; and
   determining, by the controller, if object being acted on by or proximate to the end effector is not an expected object,
   wherein the controller is further configured to, responsive to determining that the object being acted on by or proximate to the end effector is not an expected object, control the multi-axis robot based on the determination, and
   wherein options for controlling the multi-axis robot based on the determination of the object being acted on by or proximate the end effector comprise controlling the multi-axis robot to stop moving according to a predetermined stop method and/or controlling the end effector to release the object.

19. A system for robot and human collaboration, the system comprising:
   a multi-axis robot comprising an end effector for performing an action on an object;
   one or more torque sensors, each torque sensor being configured to measure a torque about a respective axis of the multi-axis robot;
   one or more sensors configured to measure one or more physical properties of an object being acted on by or proximate to the end effector; and
   a controller configured to:
   receive one or more torque measurements taken by the one or more torque sensors;
   compare the one or more torque measurements or a function of the one or more torque measurements to a threshold value;
   responsive to determining that the one or more torque measurements or a function of the one or more torque measurements is below the threshold value, control the multi-axis robot so as to cause the one or more torque measurements or the function of the one or more torque measurements to increase to a higher value, the higher value being below the threshold value, wherein controlling the multi-axis robot comprises at least one of increasing a speed of movement of the multi-axis robot and adjusting a path for the multi-axis robot; and
   responsive to determining that the one or more torque measurements or a function of the one or more torque measurements is above the threshold value, decrease a speed of movement of the multi-axis robot,
   receive one or more sensor measurements taken by the one or more sensors; and
   responsive to determining that the object being acted on by or proximate to the end effector is not an expected object, control the multi-axis robot based on the determination,
   wherein options for controlling the multi-axis robot based on the determination of the object being acted on by or proximate the end effector comprise controlling the multi-axis robot to stop moving according to a predetermined stop method and/or controlling the end effector to release the object.

20. The system according to claim 19, wherein the controller is configured to:
determine that the multi-axis robot cannot achieve a predetermined task without the one or more torque measurements or the function of the one or more torque measurements exceeding the threshold value;
responsive to the determination, iteratively:
increase the threshold value by a predetermined amount; and
determine whether the multi-axis robot is able achieve the predetermined task without the one or more torque measurements or a function of the one or more torque measurements exceeding the increased threshold value, wherein
the iteration is performed until the controller determines that the multi-axis robot can achieve the predetermined task without the one or more torque measurements or a function of the one or more torque measurements exceeding the current threshold value; and
thereafter, control the multi-axis robot based on the current threshold value.

* * * * *